United States Patent
Mastronarde et al.

(10) Patent No.: US 7,051,172 B2
(45) Date of Patent: May 23, 2006

(54) MEMORY ARBITER WITH INTELLIGENT PAGE GATHERING LOGIC

(75) Inventors: Josh B. Mastronarde, Sacramento, CA (US); Aditya Sreenivas, El Dorado Hills, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/932,395

(22) Filed: Sep. 1, 2004

(65) Prior Publication Data

US 2005/0033906 A1 Feb. 10, 2005

Related U.S. Application Data

(63) Continuation of application No. 10/033,440, filed on Dec. 28, 2001, now Pat. No. 6,792,516.

(51) Int. Cl.
*G06F 12/00* (2006.01)
*G06F 13/00* (2006.01)

(52) U.S. Cl. ............. 711/158; 711/151; 711/154; 710/240

(58) Field of Classification Search ............. 711/100, 711/137, 151, 154, 158; 709/240; 710/113, 710/114, 119–121, 240–244; 712/207
See application file for complete search history.

(56) References Cited

U.S. PATENT DOCUMENTS

| | | | | |
|---|---|---|---|---|
| 4,365,295 A | * | 12/1982 | Katzman et al. | 711/206 |
| 6,006,303 A | * | 12/1999 | Barnaby et al. | 710/244 |
| 6,038,631 A | * | 3/2000 | Suzuki et al. | 710/260 |
| 6,681,293 B1 | * | 1/2004 | Solomon et al. | 711/122 |

* cited by examiner

*Primary Examiner*—Tuan V. Thai
(74) *Attorney, Agent, or Firm*—Sharon Wong

(57) ABSTRACT

Embodiments of the present invention provide a memory arbiter for directing chipset and graphics traffic to system memory. Page consistency and priorities are used to optimize memory bandwidth utilization and guarantee latency to isochronous display requests. The arbiter also contains a mechanism to prevent CPU requests from starving lower priority requests. The memory arbiter thus provides a simple, easy to validate architecture that prevents the CPU from unfairly starving low priority agent and takes advantage of grace periods and memory page detection to optimize arbitration switches, thus increasing memory bandwidth utilization.

5 Claims, 5 Drawing Sheets

MEMORY ARBITER WITH INTELLIGENT PAGE GATHERING LOGIC

This application is a continuation of Ser. No. 10/033,440, filed on Dec. 28, 2001 now U.S. Pat. No. 6,792,516, entitled "A Memory Arbiter With Intelligent Page Gathering Logic."

BACKGROUND

1. Field

The invention relates generally to computer systems, and in particular, to memory arbitration.

2. Background Information

Computer systems that employ a CPU often utilize a memory controller and a graphics controller. The memory controller controls access by the CPU and other agents to a system memory. The graphics controller controls the display of data provided by the CPU onto a display screen, such as a cathode ray tube (CRT), using a frame buffer. Both the system memory and the frame buffer are typically implemented using arrays of Dynamic Random Access Memory (DRAM). In some computer systems, the frame buffer and the system memory are unified into a single shared memory, known as a Unified Memory Architecture (UMA).

The time associated with accessing memory, retrieving the requested data from memory, and making the retrieved data available to a requesting agent is sometimes referred to as "latency." Even those memory request that are generally more tolerant of a specific latency tend to be very sensitive to extreme variations in latency, even if these extremes occur infrequently. For example, once an isochronous stream begins, continuous data transfer becomes important and must be maintained. Therefore, the measure of quality in data transfer is often defined by the amount of data that can be lost without significantly affecting the audio or video quality. Lost data is directly related to extreme latency variations. Extreme latencies can cause data loss. If the data cannot be accessed in time, it is no longer useful.

Traditional computer systems have relied on various forms of priority-based memory arbitration, including priority, round-robin sequencing, time slice limits, high watermarks, etc., to determine the order in which an agent requesting access to memory should be serviced. While these kinds of arbitration schemes do function to reduce CPU memory latency, graphics memory traffic, such as graphics and AGP stream, are typically given lower priority, which can therefore cause a streaming agent to be "starved out" or sufficiently delayed in accessing memory, thereby resulting in lost data. Assigning higher priority to low priority graphics and AGP memory traffic results in an improvement of latency for the data, but doing so is at the expense of increased CPU memory latency. Accordingly, improvements are needed in the scheduling and processing of memory requests.

DETAILED DESCRIPTION

In the following description, numerous specific details are provided, such as the description of various computer system components in FIG. 1, to provide a thorough understanding of embodiments of the invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Embodiments of the present invention provide a memory arbiter for directing chipset and graphics traffic to system memory. Page consistency and priorities are used to optimize memory bandwidth utilization and guarantee latency to isochronous display requests. The arbiter also contains a mechanism to prevent CPU requests from starving lower priority requests. The memory arbiter thus provides a simple, easy to validate architecture that prevents the CPU from unfairly starving low priority agent and takes advantage of grace periods and memory page detection to optimize arbitration switches, thus increasing memory bandwidth utilization. As discussed in detail below, memory arbiter includes an arbitration state machine, priority arbitration logic, grace counter with page matching logic, ceiling counter and smart CPU page detection.

Figure 1:
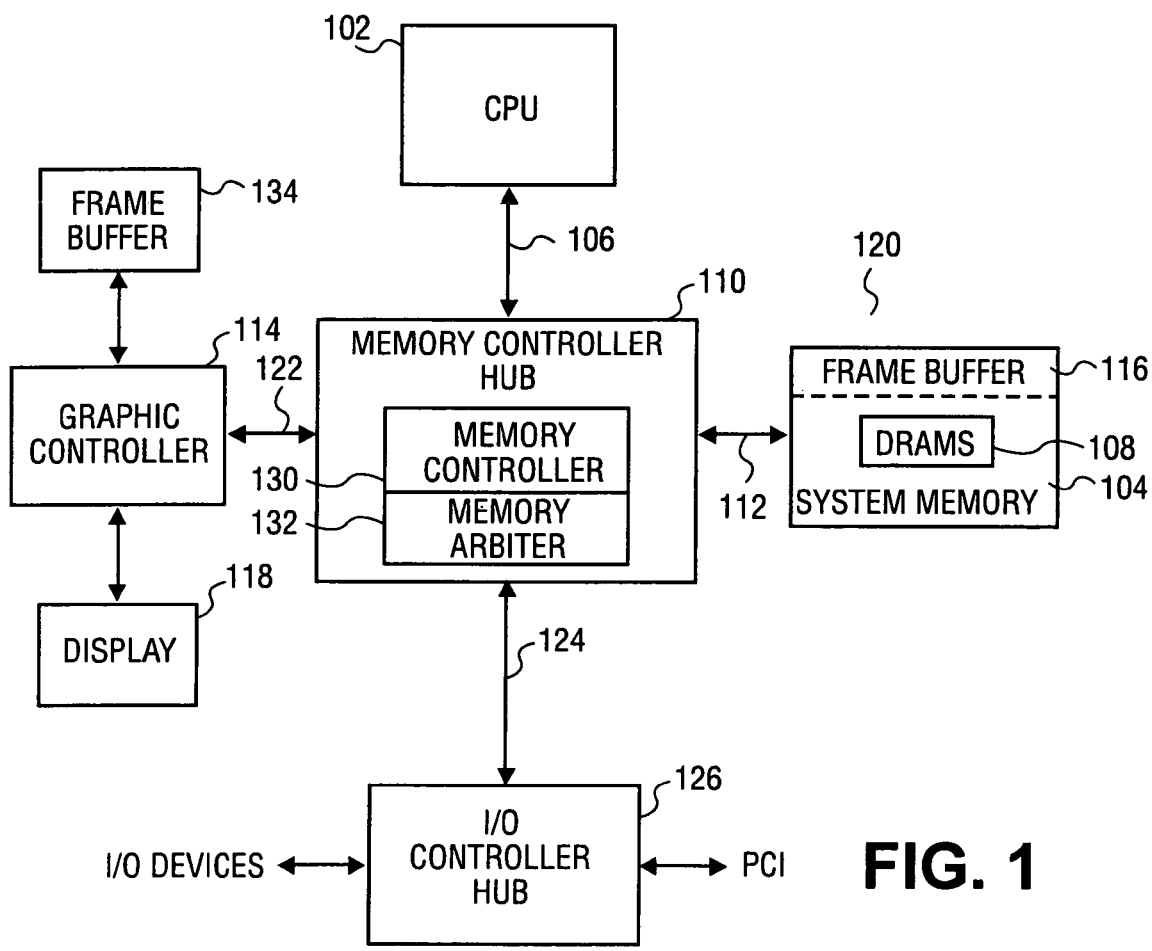
FIG. 1 illustrates a functional block diagram of an embodiment of an exemplary computer system embodying the present invention.

FIG. 1 illustrates a functional block diagram of an embodiment 100 of an exemplary computer system embodying the present invention. Computer system includes CPU 102 and system memory 104 comprising rows of DRAMs 108. System memory 104 is a memory in which application programs are stored and from which CPU 102 primarily executes. One skilled in the art will recognize that system memory can be comprised of other types of memory and the use of DRAM 108 used for illustrative purposes only. For example, system memory 104 can be comprised of SDRAM (Synchronous DRAM) or RDRAM (RAMBUS DRAM) or DDR (Double Data Rate synchronous DRAM).

As used herein, a "page" refers to a block of data stored within a same row of DRAMs 108 that comprise system memory 104. The row is accessed via a row address provided by memory controller hub 10, and then the column address of the particular datum being addressed is provided (typically using the same address lines used to provide the row address). Another column address can be used to access additional data within the row without providing the row address again (referred to as a "page hit"). Reading or writing additional data from the same row in this manner (referred to as "page mode") may allow for lower latency access to the data, since the row address need not be provided in between each column access. This also results in better utilization (and thus available bandwidth) of memory.

As used herein, a "memory request" is a transfer of command and address between an initiator and system memory 104. A "read memory request" is a transfer of data from system memory 104 to the initiator. For example, CPU 102 may initiate a read memory request to transfer data from system memory 104 to CPU 102. A "write memory request"

is a transfer of data from the initiator to system memory 104. For example, CPU 102 may initiate a write memory request to transfer data from CPU 102 to system memory 104. Control information (including, e.g. the priority level and the read/write nature of the memory request) may be conveyed concurrent with the memory request or using a predefined protocol with respect to conveyance of the address.

CPU 102 is coupled to memory controller hub 110 by host bus 106. Memory controller hub 110 is in turn coupled to system memory 104 by memory bus 112. According to an embodiment of the present invention, memory controller hub 110 includes memory controller 130 and memory arbiter. Memory arbiter 132 performs an arbitration scheme that supports isochronous display requests, while at the same time preserving low latency aspects of memory service for CPU 102, graphics and other high and low priority agents. Although memory arbiter 132 is shown in FIG. 1 as residing in memory controller hub 110, it is to be appreciated that memory arbiter 132 can reside in other components of computer system 100. For example, memory arbiter 132 can be located in I/O controller hub 126. Further, it is also possible to include more than one memory arbiter 132 in computer system 100. Therefore, the present invention is not limited by the number of memory arbiters 132 or by their specific location.

Memory Controller Hub 110 is also coupled to graphics controller 114. Graphics controller maybe integrated into the Host/Memory controller. Graphics controller 114 accesses local frame buffer 116 to store and retrieve graphics data stored therein for display on display 118. Display 118 can be a CRT, liquid crystal display, or other display device. For systems that use an UMA configuration, local frame buffer 116 is replaced by partitioning a portion of system memory 104 to create frame buffer 116, resulting in shared memory 120.

Graphics controller 114 is provided to control the rendering of text and images on display 118. Graphics controller 114 may embody a typical graphics accelerator generally known in the art to render three-dimensional data structures that can be effectively shifted into and from system memory 104. Graphics controller 114 may therefore be a master of AGP bus 122 in that it can request and receive access to a target interface within memory controller hub 110 to thereby obtain access to system memory 104. A dedicated graphics bus accommodates rapid retrieval of data from system memory 104. For certain requests, graphics controller 114 may further be configured to generate PCI protocol transactions on AGP bus 122. The AGP interface of memory controller hub 110 may thus include functionality to support both AGP protocol transactions as well as PCI protocol target and initiator transactions.

Memory controller hub 110 is coupled by hub interface 124 to I/O controller hub 126. I/O controller hub 126 includes a PCI interface for expansion cards as well as a plurality of interfaces to I/O devices. Asynchronous data transfers, such as transfers from a disk drive, mouse, keyboard, and printer, and isochronous I/O data transfers, such as those that support audio, video, modem, network, or other streaming I/O, may be routed through I/O controller hub 126. It is noted that, while the AGP, hub interface, PCI, and ISA buses have been used as examples in the above description, any bus architectures may be substituted as desired.

Figure 2:
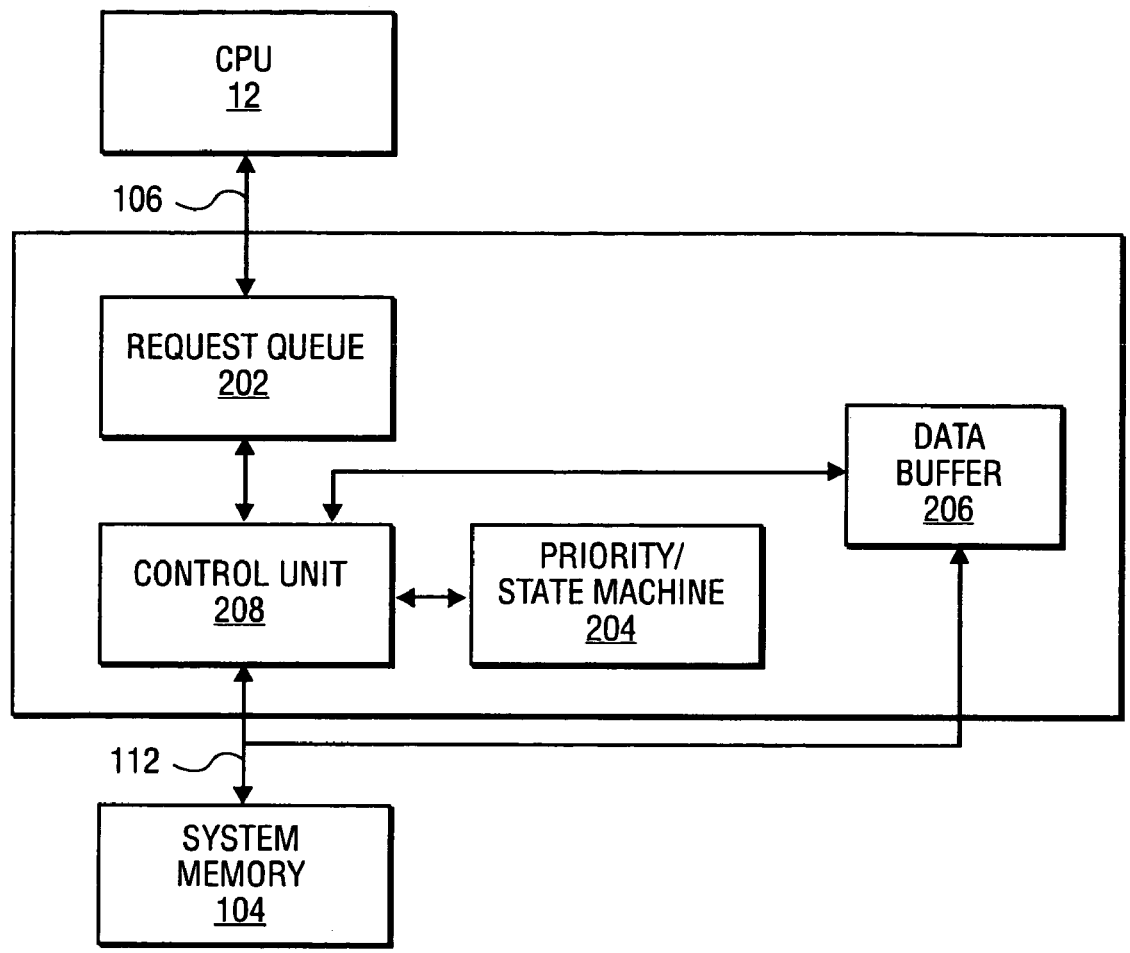
FIG. 2 illustrates a functional block diagram of an embodiment of a memory arbitrator and controller.

FIG. 2 illustrates a functional block diagram of an embodiment 200 of memory arbitrator 132. Memory arbiter 132 includes request queue 202, priority/state machine unit 204, data storage buffer 206 and arbiter controller 208.

Memory arbiter 132 is coupled to CPU 102 via host bus 106. CPU 102 provides address, R/W, priority and data information to memory arbiter 132. In particular, address, R/W, priority and data is applied to request queue 202, and data is coupled to data storage buffer 206. Request queue 202, data storage buffer 206, and priority/state machine unit 204 are coupled to controller 208. Controller 208 is coupled to system memory via bus 112

Figure 3:
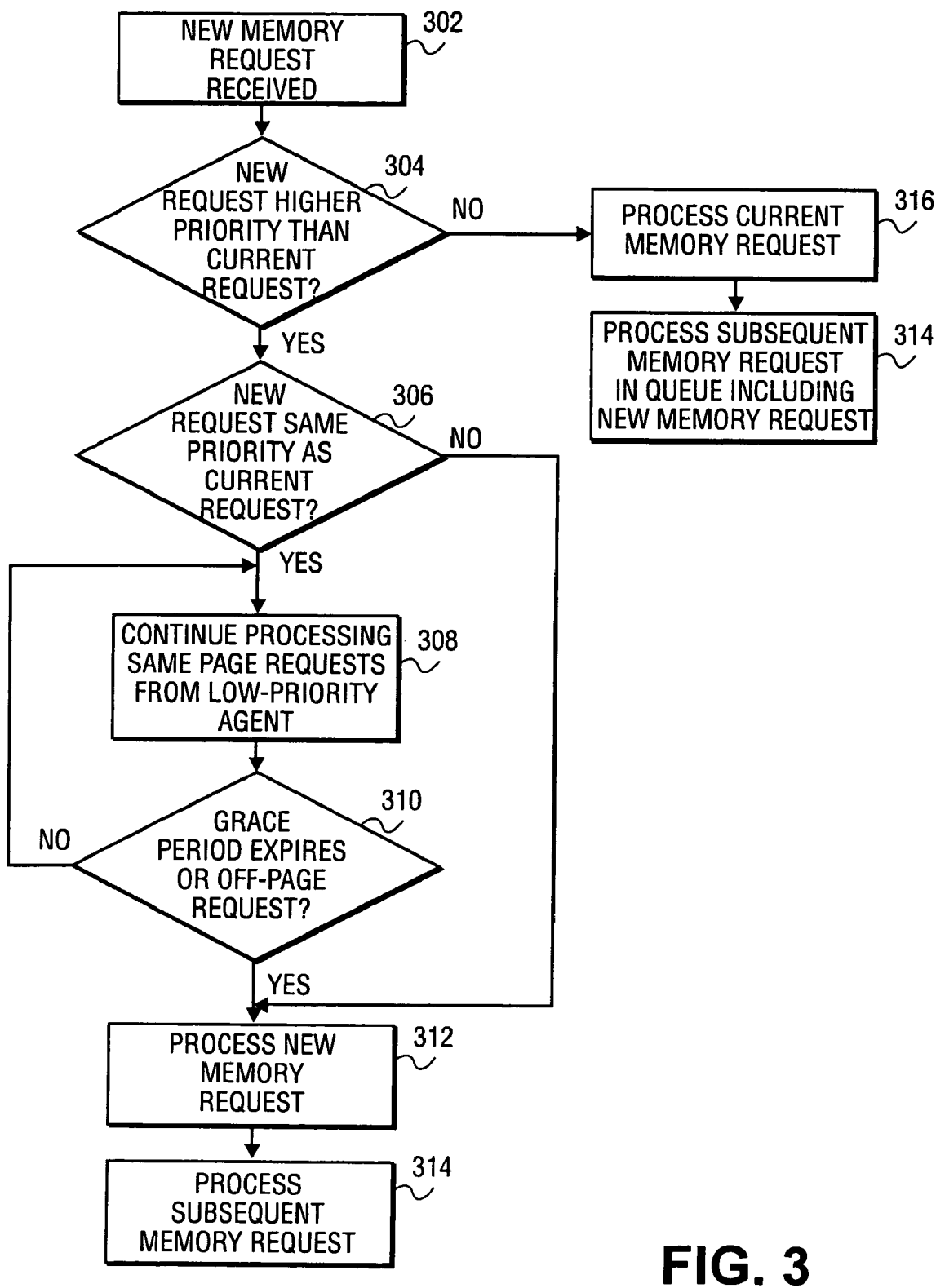
FIG. 3 illustrates a detailed flow diagram of an embodiment of a process for continuing to service a lower priority agent when a higher priority agent issues a same page memory request.
Figure 4:
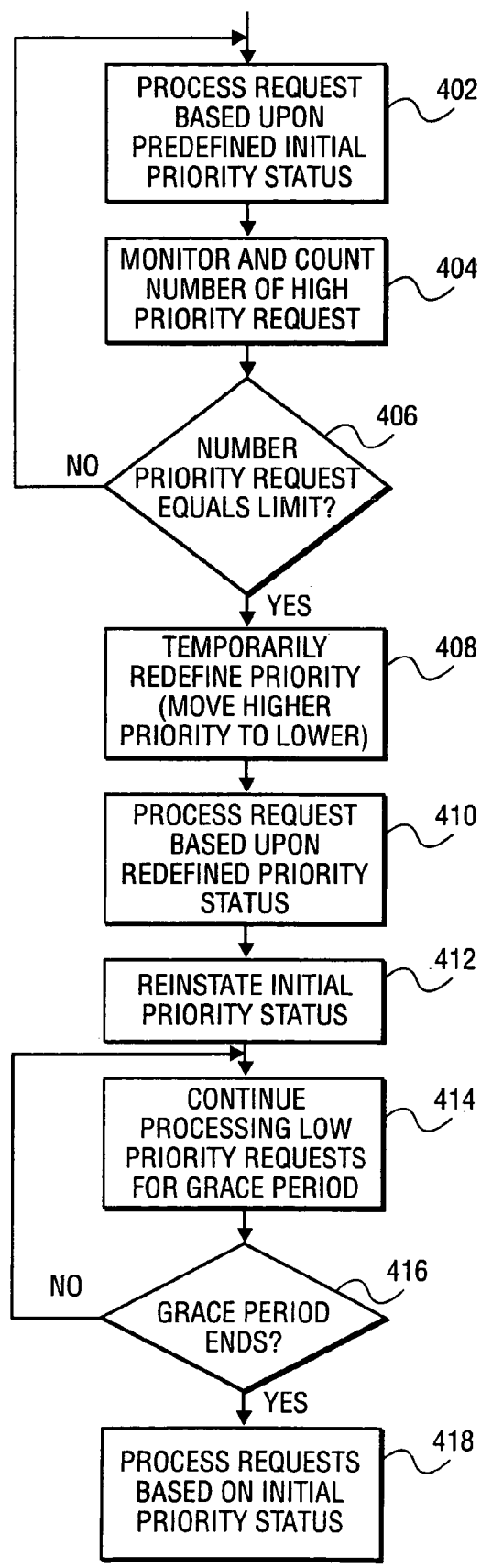
FIG. 4 illustrates a detailed flow diagram of an embodiment of a process for preventing higher priority agents from starving lower priority agents by monitoring the number of high priority requests issued to memory.
Figure 5:
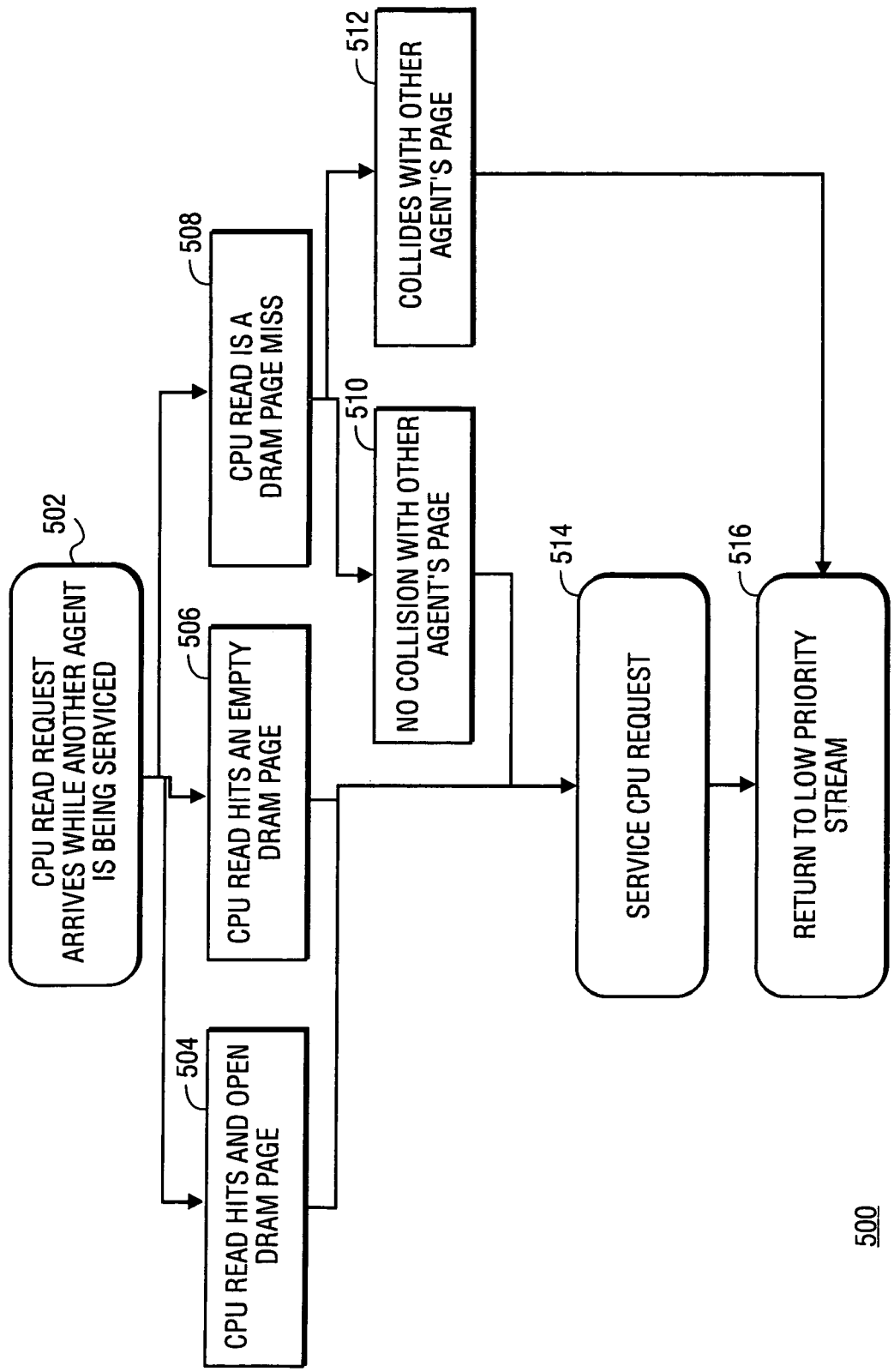
FIG. 5 illustrates a detailed flow diagram of an embodiment of a process for improving CPU read latency without impacting memory utilization or high priority agent.

Memory arbiter 132 is configured to receive bus requests from CPU 102 upon host bus 106, and to initiate bus requests upon host bus 106 in response to requests received from other devices attached thereto. If memory arbiter 132 receives a memory request upon host bus 106, memory arbiter 132 routes the address of the memory request and the corresponding tag from host bus 106 upon to memory controller 208. The read/write nature of the memory request and the corresponding priority is conveyed to request queue 202. If the memory request is a write memory request, the corresponding data is conveyed to request queue 202. Request queue 202 stores the information. If request queue 202 is empty prior to receipt of a memory request and system memory 104 is idle, the memory request may be selected by controller 208 for presentation to system memory 104. Controller 208 may select memory requests from request queue 202 in order. However, a as illustrated in FIGS. 3–5 and discussed in detail below, a memory request (as indicated via the priority assigned to the memory request by the master for the memory request) may be selected over another memory request ahead in line in the queue. For example, as shown in FIG. 3, embodiments of the present invention provide a process for continuing to service a lower priority agent when a higher priority agent issues a same page memory request. Also, as shown in FIG. 4, embodiments of the present invention provide a process for preventing higher priority agents from starving lower priority agents by monitoring the number of high priority requests issued to memory. Furthermore, as shown in FIG. 5, embodiments of the present invention provide a process for improving CPU read latency without impacting memory utilization of the high priority agent. Controller 208 conveys the address of the selected memory request to system memory 104 along with corresponding control information.

Arbitration State Machine

According to an aspect of an embodiment of the arbitration scheme, priority/state machine 204 keeps track of which request agent (e.g., the CPU 102 or a low priority graphics request) is currently granted. The output of the state machine is used to select and load commands and prepare them to be sent to the controller 208.

Priority Arbitration Logic

Memory arbiter 132 includes priority arbitration logic for determining which agents has a request available, and which of those has priority. A priority can be assigned to each agent, and when two or more agents make simultaneous requests, then the higher-priority agent is chosen to access the resource while the lower-priority agent is delayed. Such priority-based arbitration maximizes performance of higher-priority agents at the expense of lower-priority agents. In a typical implementation, the priorities are fixed in the arbiter per the requesting agent. Some agents have multiple priority levels.

In accordance with embodiments of the present invention, by knowing the maximum number of page hits and minimizing the number of page misses in the stream, the amount of time it will take to switch to the high priority agent can be predicted. One of the highest priority agents is the graphics display. In a typical implementation, memory arbiter 132 services high priority agents such as display FIFOs to ensure that display refresh is given highest priority. Processor initiated requests are also considered high priority. CPU requests are critical from a system benchmark perspective because the more requests the CPU gets through, the faster most benchmarks will appear. Agents, such as 2D/3D engines and AGP bus, are assigned lower priority status. Other prioritization sequences can be implemented, and so the present invention is not limited by the specific order in which individual isochronous resource blocks are serviced.

The priority arbiter thus determines which of the agents requesting memory access has the highest priority. This highest-priority agent is serviced first. Priority arbiter grants access to the chosen agent by asserting a grant signal for that agent. Once the agent has completed its memory service, it can de-assert its request line, allowing priority arbiter to choose the next-highest priority agent of the remaining agents making requests. The grant line for the newly chosen agent is asserted while the grant line for the finished agent is de-asserted.

Alternatively, priority arbiter can kick off the current agent when a higher-priority agent makes a new request, or after some predetermined period of time. Priority arbiter de-asserts the grant line for the current agent, waits for the agent to responds by de-asserting its request line, and then asserts the grant line for a different agent.

Grace Counter with Page Match Logic

Embodiments of the present invention provide a process for continuing to service a lower priority agent when a higher priority agent issues a same page memory request. In accordance with embodiments of the present invention, a grace counter is used when a request with higher priority than the current agent arrives. During the grace period, the current agent continues to be serviced as long as its request addresses hits the same page as its service request. Upon expiration of the grace period timer or a page miss, the memory arbiter switches to the high priority agent. Embodiments of the present invention thus allow high priority isochronous requests to be serviced with predictable latency, since there will be no more than one page miss before the isochronous agent is serviced. Moreover, memory utilization is improved and all agents that perform streams of same-page requests see better throughput.

In particular, when a higher priority request comes in, and the lower priority agent is requesting addresses on the same page, those same page requests take less time to execute. Thus, as long as a lower priority agent's requests stay on the same page and therefore do not take up much time, it will be allowed to continue for a certain amount of time. The time allotted for the lower priority agent to execute its' same page requests is determined by either a timer that eventually breaks the requests or if the lower priority agent tries to issues a different page request, or if the lower priority agent has no more requests. At that point, control is switched to the higher priority agent.

Referring to FIG. 2, memory arbiter 132 is configured to arbitrate a data transfer to system memory 104 if the lower priority, current memory request and the higher priority memory request are within the same page. By continuing to service a lower priority memory request for a predetermined period of time when a higher priority memory request initiates a same page request, memory utilization is improved and all agents that perform streams of same-page requests see better throughput. If the higher priority agent accesses a different page, then the current page would be deactivated and the new page accessed by providing the row address of the higher priority memory request, then the corresponding column addresses. Subsequently, the new page would be deactivated and the page corresponding to the lower priority memory request re-established.

Additionally, if a memory request is current to system memory 104, the memory request being received is to the same page as the current memory request, and the priority level assigned to the memory request is higher than the priority level of the current memory request, controller 208 is configured to continue performing the current until the grace period expires or an off page request is initiated by the current lower priority agent, or if the lower priority agent stops requesting.

Controller 208 records the page (e.g. the row portion of the address) and the priority level of the current memory request in priority/state machine unit 204. If a higher priority memory request is detected (by comparing the priority level stored in priority/state machine unit 204 to the priority level of incoming memory requests), and if the incoming memory request is to the same page as the current memory request (detected by comparing the page recorded in priority/state machine unit 204), then the current data transfer may be continued until the grace period expires or an off page request is initiated by the current lower priority agent. After the grace period expires or the lower priority agent initiates an off-page request, the higher priority memory request is performed. The column portion of the address of the higher priority memory request is presented, and the corresponding data transferred. Subsequently, the lower priority (formerly current) memory request is completed by presenting the column portion of the address corresponding to the next data to be transferred, and by transferring the remaining data. In one embodiment, DRAM banks may be accessed independently to allow multiple memory requests to be performed between system memory 104 and main memory controller 130. For such an embodiment, multiple open pages and corresponding priority levels may be stored in priority/state machine unit 204.

If a lower priority request is serviced under this condition, the grace counter is correspondingly decremented while servicing the lower priority request, thereby ensuring that memory utilization is improved and all agents including low priority agents that perform streams of same page requests see better throughput. This optimization feature of continuing to service low priority same page requests for a predetermined period of time helps to reduce or eliminate idle memory time. Otherwise, the low priority same page request would have to be delayed until the high priority request is completed. Memory arbiter 132 checks whether the end of the grace period has arrived. If it has, then arbiter 132 switches to the high priority request.

In accordance with the present invention, a portion of the low priority same page request can be serviced in the grace period, and then the service can be completed after the high priority event is completed.

Variations are possible according to embodiments of the invention. For example, in one embodiment, if a higher priority same page request is received and the amount of time in the grace service period is insufficient to complete service of any same page low priority request, then the entire service of the low priority same page request is delayed until the high priority same page request is serviced.

In both situations, time in the grace period is dedicated to completion of the low priority same page request (thereby possibly reducing the amount of time to service low priority request during a subsequent period) in order to ensure that the service of the low priority same page request is not unreasonably delayed to yet another period.

If the end of the grace period has not yet arrived after completing low priority same page request at step 76, the agent continues to be serviced as long as its requests fall on the same page. During grace periods, one or more low priority same page requests may be received again. If a lower priority same page request is pending, then the request is serviced until the end of the grace period is reached. If there are no lower priority requests pending, then no grace period is activated and the higher priority request is serviced immediately.

Referring to FIG. 3, a detailed flow diagram of an embodiment 300 of a process for continuing to service a lower priority agent when a higher priority agent issues a same page memory request is illustrated. A new memory request is initially received (step 302). Initially, it is determined whether the new memory request is higher priority than the current memory request (step 304). If so, it is determined whether the new memory request is to the same page as the current memory request (step 306). If the incoming memory request is to the same page as the current memory request (detected by comparing the page recorded in priority/state machine unit 204), then the current data transfer may be continued (step 308) until the grace period expires or an off page request is initiated by the current lower priority agent (step 310). After the grace period expires or the lower priority agent issues an off-page request (step 312), the new memory request is queued for subsequent presentation to system memory (step 312). After execution of the new memory request, processing of subsequent memory requests, including the lower priority memory request, is resumed (step 314).

If the new memory request is the same or lower priority (step 304), then the current memory request continues to be executed (step 316). The new memory request is queued for subsequent presentation to system memory 104 (step 314). The address of the higher priority memory request is presented, and the corresponding data transferred.

If the new memory request is higher priority than the current memory request (step 304), but the new memory request is in a different page, the current memory request continues (step 306). The new memory request is queued for subsequent presentation to system memory 104 (step 312). After execution of the new memory request, processing of subsequent memory requests, including the lower priority memory request, is resumed (step 314).

Ceiling Counter

FIG. 4 illustrates a detailed flow diagram of an embodiment 400 of a process for preventing higher priority agents from starving lower priority agents by monitoring the number of high priority requests issued to memory. The present invention is particularly advantageous since the CPU can be a bandwidth hog—it can send so many requests that they cannot possibly be met. Since CPU requests are assigned a higher priority, it can starve out lower priority requests, such as graphics or AGP stream requests. In particular, a ceiling counter prevents the CPU from starving but low priority agents but still allows the CPU to retain its higher priority status. The CPU executes a predefined number of requests and once such requests have been issued, the CPU requests are moved below other lower priority streams, such as the AGP and graphics streams. Lower priority requests that come in, such as AGP or a graphics low priority requests, now have a higher priority and are accordingly serviced instead. (CPU same page requests may be serviced for a predefined grace period before switching to service the lower priority requests.) This prevents CPU from starving low priority agents out.

Referring to FIG. 4, requests are processed based upon an initial predefined priority status (step 402). In a typical implementation, memory arbiter 132 services high priority agents such as display FIFOs to ensure that display refresh is given highest priority. Processor initiated requests are also considered high priority. CPU requests are critical from a system benchmark perspective because the more requests the CPU gets through, the faster most benchmarks will appear. Agents, such as 2D/3D engines and AGP bus, are assigned lower priority status. Other prioritization sequences can be implemented, and so the present invention is not limited by the specific order in which individual isochronous resource blocks are serviced.

The number of same agent, high priority requests issued to system memory 104 is monitored and counted (step 404). In a typical implementation, a counter is incremented each time an IOQ request is issued. In another implementation, the memory controller 130, memory arbiter 132, or another device polls buffers (not shown) that are coupled to shared memory 120, and makes a determination as to the number of CPU (e.g. IOQ) requests issued to system memory 104.

Once the number of same agent, high priority requests reaches a predefined limit (step 406), the predefined priority statuses are temporarily redefined to allow high priority agents' to be moved below lower priority agents (step 408). This prevents the higher priority agent from starving lower priority agent requests. A lower priority agent request is then processed based on the redefined priority status (step 410). The initial priority statuses are reinstated (step 412). In other words, high priority agent requests, such as CPU IOQ requests, are reinstated to high priority status (step 412). Same agent, lower priority requests continue to be processed for a predefined grace period (step 414). If a lower priority request is serviced under this condition, the grace counter is correspondingly decremented while servicing the lower priority request, thereby ensuring that memory utilization is improved and all agents including low priority agents that perform streams of same page requests see better throughput. This mechanism is advantageous since the higher priority agent can request more memory bandwidth than is available, which would prevent any lower priority agent from being serviced. After the grace period expires (step 416), requests are processed according to the initial predefined priority statuses. For example, CPU IOQ requests are processed.

In a typical implementation, a ceiling counter counts the number of IOQ (CPU and snooped read and write) requests issued to DRAM. Once a pre-programmed number has been reached, the IOQ agents' priorities are moved below AGP. This prevents the CPU from starving AGP requests, if any are available. Once an AGP request is services, the priorities switch back to normal (CPU above AGP), and the AGP requester gets a grace period. This mechanism is necessary because it is possible for the CPU to request more memory bandwidth than is available, which would prevent any lower priority agent from being serviced.

Smart CPU Page Detection

FIG. 5 illustrates a detailed flow diagram of an embodiment of a process for improving CPU read latency without impacting memory utilization or high priority agent. When a non-CPU request stream is being serviced, and a CPU request arrives (step 502), the CPU read address is presented to the memory controller's page detection logic.

If the CPU read request hits an already "open" page (step 504) or if the CPU read request hits an "empty" page (meaning no currently open page has to be closed to open the CPU page) (step 506), or if the CPU read request is a page miss (step 508) but the page to be closed is not the one being accessed by the current agent (step 510), then the CPU read request is sent to the DRAM 108 controller where it is serviced (step 514), and the arbiter returns to the original agent (step 516).

If the CPU read request is a page "miss" (step 508) which would require closing the page the original agent is being used (step 512), the CPU read request is not serviced until the normal arbitration switches to it (step 516).

Referring to step 504, if the CPU read request hits an already "open" page, the CPU read request is sent to the memory controller where it is serviced (step 514), before arbiter returns to the original agent (step 516). In particular, if a memory request is current to system memory 104, the memory request being received is to an open page, and the priority level assigned to the memory request is higher than the priority level of the current memory request, controller 208 is configured to service the higher priority level request (step 514). After the higher priority level request is completed, the controller returns to servicing the current lower priority agent. Thus, a higher priority memory request (as indicated via the priority assigned to the memory request by the master for the memory request) may be selected over an in progress, lower priority memory request.

Controller 208 conveys the address of the selected memory request to system memory 104 along with corresponding control information via bus 112. In a typical implementation, the control information includes a write enable line to indicate that the request is a read or write, a row address strobe line to indicate that the row portion of the address is being conveyed, and a column address strobe line to indicate that the column address is being conveyed. If the request is a read, the selected data is provided by system memory 104. Data storage buffer 206 may capture the data from the data bus under the direction of controller 208.

Controller 208 records the page (e.g. the row portion of the address) and the priority level of the current memory request in priority/state machine unit 204. If a higher priority memory request is detected (by comparing the priority level stored in priority/state machine unit 204 to the priority level of incoming memory requests), and if the incoming memory request is to an open page (detected by comparing the page recorded in priority/state machine unit 204), then the controller 208 services the higher priority level request (step 514). After the higher priority level request is completed, the controller returns to servicing the current lower priority agent.

Referring to step 506, if the CPU read request hits an "empty" page, the CPU read request is sent to the memory controller where it is serviced (step 514), before arbiter returns to the original agent (step 516). In particular, an "empty" page is defined as no currently open page has to be closed to open the CPU page. In other words, a page can be opened without interrupting the other stream.

In particular, if a memory request is current to system memory 104, the memory request being received is to an empty page as the current memory request, and the priority level assigned to the memory request is higher than the priority level of the current memory request, controller 208 is configured to service the higher priority level request (step 514). After the higher priority level request is completed, the controller returns to servicing the current lower priority agent. Thus, a higher priority memory request (as indicated via the priority assigned to the memory request by the master for the memory request) may be selected over an in progress, lower priority memory request.

Referring to step 508, if the CPU read request is a page "miss" (i.e. requires closing of a page being used) (step 508) but the page to be closed is not the one being accessed by the current agent (step 510), then the CPU read request is sent to the DRAM 108 controller where it is serviced (step 514), and the arbiter returns to the original agent (step 516).

If the CPU read request is a page "miss" (step 508) which would require closing the page the original agent is being used (step 512), the CPU read request is not serviced until the normal arbitration switches to it (step 516).

In particular, if a memory request is current to system memory 104, the memory request being received is to a page that requires another page to be closed before it can be accessed, and the priority level assigned to the memory request is higher than the priority level of the current memory request, and the page to be closed is not the one being accessed by the current agent (step 510), controller 208 is configured to service the higher priority level request (step 514). After the higher priority level request is completed, the controller returns to servicing the current lower priority agent (step 516).

If the page to the same as the page accessed by the current agent (step 510), controller 208 is configured to service the higher priority level request (step 514), CPU read request is not serviced until the normal arbitration switches to it (step 516).

Although the steps in the flowchart of FIGS. 3–5 are shown serially in a particular order for ease of understanding, any order that achieves a similar result may be used. Furthermore, many of the steps may be performed in parallel in the combinatorial logic forming memory arbiter.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A memory arbiter, comprising:
   a memory controller configured to receive memory requests and corresponding priorities, wherein the memory controller is configured to interrupt servicing a current request to service a higher priority request when the higher priority request accesses an open page or empty page or results in a page miss but the page to be closed is not the one being accessed by the current request; and
   in response to a higher priority agent issuing a same page memory request, continuing to service a lower priority agent for a predefined period of time or until a page miss occurs.

2. The memory arbiter of claim 1, further comprising:
   in response to a higher priority agent issuing a same page memory request, continuing to service a lower priority agent for a predefined period of time or until a page miss occurs.

3. The memory arbiter of claim 2, wherein the memory controller is configured to resume servicing lower priority requests after the higher priority request is serviced.

4. The memory arbiter of claim 1, wherein the memory controller is configured to continuing to service a current request if the higher priority request results in a page miss but the page to be closed is the one being accessed by the current request.

5. The memory arbiter of claim 1, wherein the higher priority request is a CPU read request.

* * * * *